United States Patent Office.

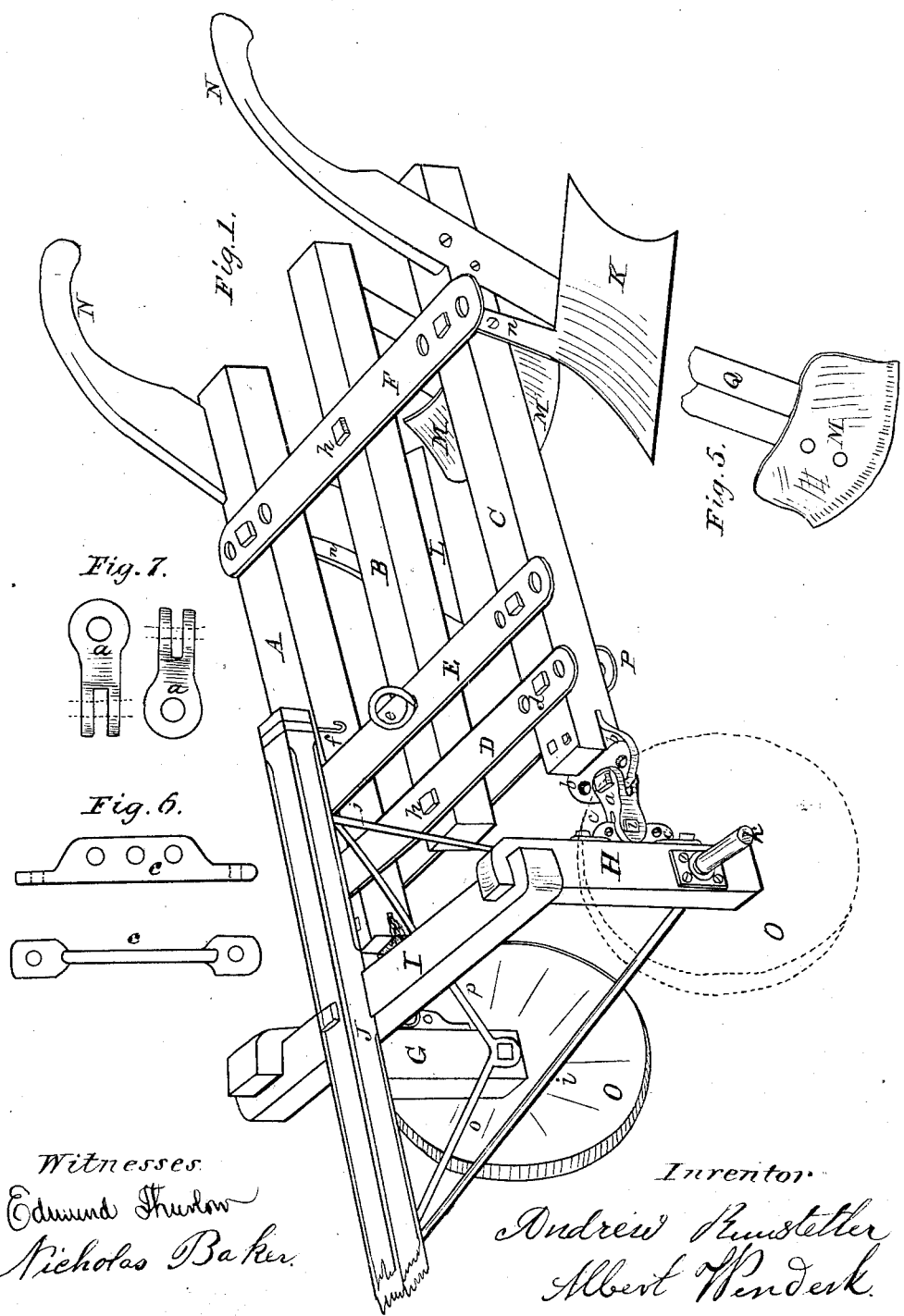

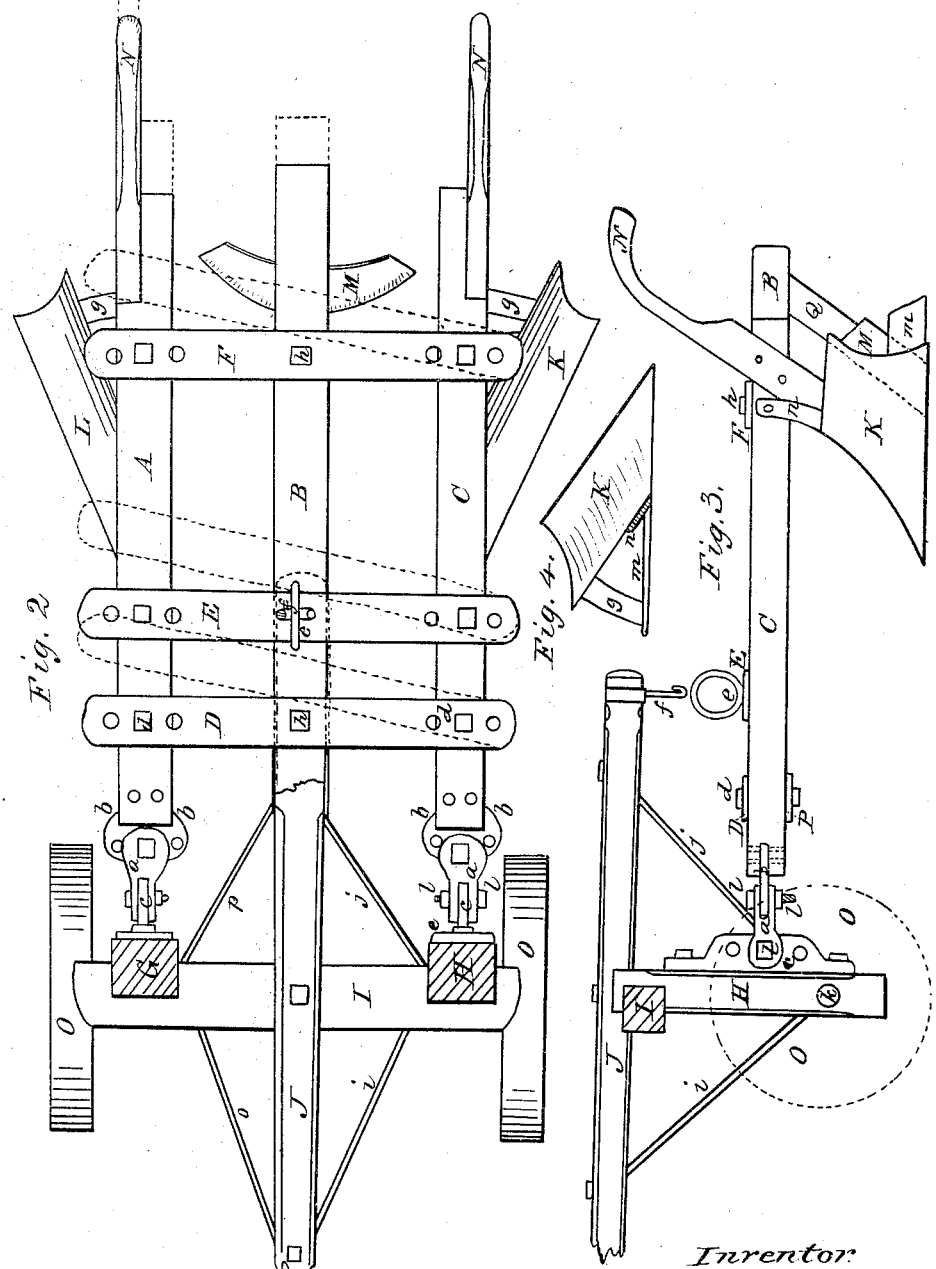

ANDREW RUNSTETLER AND ALBERT WINDECK, OF PEORIA, ILLINOIS.

Letters Patent No. 74,005, dated February 4, 1868.

IMPROVEMENT IN COTTON-PLOUGH AND CULTIVATOR.

*The Schedule referred to in these Letters Patent and making part of the same.*

Be it known that we, ANDREW RUNSTETLER and ALBERT WINDECK, of the city and county of Peoria, and State of Illinois, have invented a new and useful Machine for Cotton-Ridging and Cultivating, called "Cotton-Ridging Plough and Cultivator;" and we do hereby declare that the following is a full, clear, and exact description of the construction and operation of the same, reference being had to the annexed drawings, making a part of this specification, in which—

Figure 1 is a perspective view.
Figure 2, a plan.
Figure 3, a side elevation.
Figure 4, bird's-eye view of "plough."
Figure 5, perspective view of shovel.
Figure 6, elevation (front and side) of bracket (on rear of posts G and H.)
Figure 7, diagrams of link.

For cultivating cotton, this machine is used without the central beam and shovel. For ridging out soil for planting cotton, the shovel comes into use.

The frame of this machine consists of three wooden beams, A B C, five feet long each, and three inches by three and a half inches square, placed parallel to each other. To the outer beams A C the common-shaped plough K L is attached, and to the centre beam B the shovel M, for cleaning out the furrow, is hung. The beams A B C are connected by three transverse iron "gauges" of three-eighths thickness, and about one and a half inches wide by twenty-four inches in length. Two of these, D E, run across the forward ends of the three beams, about eight inches apart, each gauge having three bolt-holes in each of its ends, for regulating the width between the ploughs in cultivating, &c. Both gauges are bolted through their ends to the outer beams A C, through either of said holes, according to width of furrow required. The front gauge D is also bolted through its centre to the central beam. Under this gauge, and below the three beams A B C, is another gauge P, of same size, to support the middle beam carrying the shovel when wanted for "ridging." The rear gauge F is also bolted to each beam in the same manner, and is situated just forward of the plough-handles, and supports the rear of central beam B which carries the shovel. The outer beams, at their front ends, have hinges connecting them with the posts G H, to which are attached the tongue J and wheels O. They consist of plates of iron, $b\ b$, the link $a$, and bracket $e$, the iron plate $b\ b$ perforated with three holes, (either of which is used when altering the width of furrows,) which is let into the ends of beams C A, and fastened with bolts. This plate $b\ b$ is connected with the iron link $a$ by bolt. The link has jaws or openings at each extremity, admitting said plate on one side, and the brackets $e$ on the other. The plate $b\ b$ is about five inches wide by one-half inch thick, and pierced, as before said, with three holes for connection with link, the holes being for accommodation of wider or narrower gauge. The link $a$ is of sufficient size, say four inches long, to connect strongly the two parts of the machine. The upright iron brackets $c\ c$ have three holes one above the other, through either of which the link is bolted, and being for the purpose of raising or lowering the depth of furrow. The posts G H, about the same size as the other timbers, are braced together by the cross-beam I, and are carried by the wheels O on axles $k\ k$, bolted to outside of posts. This cross-beam carries the tongue J, which is further braced by the iron rods $i\ j\ o\ p$ to lower ends of posts G H, and carries on its rear end the hook $f$, which is hooked nto the ring $e$ on the gauge E, when turning the machine or leaving the field, and which raises the ploughs or shovels from the ground. The wheels O are of wood or iron, say sixteen inches in diameter, and about two feet apart. The shovel M is attached to brace Q on rear end of centre beam B, and is of cast steel, say seven inches high by sixteen inches wide, having a convex surface, and throwing the soil (left by and between the ploughs) into ridges on both sides, the ploughs L K at the same time throwing up adjoining ridges on each side.

The operation of the machine is as follows: When wanted for "ridging" the cotton-field the two ploughs and the shovel are used together. When for cultivating, the centre beam, with shovel, is removed by simply removing the bolts in the gauges in front and rear, D F. When turning at the end of furrow or other places, the frame is hooked to the tongue by means of the hook $f$ and ring $e$, and the gauges D E F being fastened but by one bolt at each of their ends to the outer timbers A C, allow the machine to adapt itself to the arc in which the horses are moving, by a parallel motion in each timber, as represented at the dotted lines in fig. 2 of drawing, and moving altogether on eight joints. The machine is drawn by two horses, and is capable of doing better work, more expeditiously, and consequently save more labor than by the present mode of using a single plough for both "ridging" and cultivating cotton.

What we claim as our invention, and desire to secure by Letters Patent, is—

The construction, combination, and arrangement of the frame-pieces A B C, the iron gauge-pieces D E F, hook and ring, and removable shovel M, as attached to the beam or piece B, all as shown and for the purposes described.

ANDREW RUNSTETLER,
ALBERT WINDECK.

Witnesses:
E. THURLOW,
N. BAKER.